US010183412B2

(12) United States Patent
Balsells Mercadé et al.

(10) Patent No.: US 10,183,412 B2
(45) Date of Patent: Jan. 22, 2019

(54) CUTTING DEVICE FOR FLEXIBLE MATERIAL

(71) Applicant: TKT BRAINPOWER ENGINEERING, S.L., Barcelona (ES)

(72) Inventors: Antoni Balsells Mercadé, Barcelona (ES); Antoni Guimerà Pedrola, Barcelona (ES)

(73) Assignee: TKT BRAINPOWER ENGINEERING, S.L., Barcelona (ES)

( * ) Notice: Subject to any disclaimer, the term of this patent is extended or adjusted under 35 U.S.C. 154(b) by 0 days.

(21) Appl. No.: 15/102,192

(22) PCT Filed: Dec. 5, 2014

(86) PCT No.: PCT/ES2014/070899

§ 371 (c)(1),
(2) Date: Jun. 6, 2016

(87) PCT Pub. No.: WO2015/082749

PCT Pub. Date: Jun. 11, 2015

(65) Prior Publication Data

US 2016/0303751 A1 Oct. 20, 2016

(30) Foreign Application Priority Data

Dec. 5, 2013 (ES) ................................ P201331785

(51) Int. Cl.
*B62D 7/04* (2006.01)
*D06H 7/00* (2006.01)
(Continued)

(52) U.S. Cl.
CPC ............... *B26D 7/04* (2013.01); *B26D 1/025* (2013.01); *B26D 1/045* (2013.01); *B26D 7/01* (2013.01);
(Continued)

(58) Field of Classification Search
CPC ... B26D 3/08; B26D 7/04; B26D 1/22; B26D 1/15; B26D 7/14; Y10T 83/6592; Y10T 83/727; Y10T 83/872
(Continued)

(56) References Cited

U.S. PATENT DOCUMENTS 1,782,674 A * 11/1930 Baumgartner ........... B26D 7/08
83/115
2,787,427 A * 4/1957 Marczincsin ........... B29C 53/32
242/527.3
(Continued)

FOREIGN PATENT DOCUMENTS

EP 0 607 525 7/1994
EP 0 778 369 A2 6/1997
(Continued)

OTHER PUBLICATIONS

International Search Report issued by the International Searching Authority (ISA/O.E.P.M.) dated Mar. 6, 2015 in connection with International Application No. PCT/ES2014/070899.
(Continued)

*Primary Examiner* — Ghassem Alie
(74) *Attorney, Agent, or Firm* — Gary J. Gershik; Cooper Dunham LLP

(57) ABSTRACT

The cutting device includes a blade (1), in which either the blade (1) can move relative to a sheet of flexible material (4) or the sheet of flexible material (4) can move relative to said blade (1), and the blade (1) is associated with a plurality of independent flexible bristles (2), which press and stabilize the flexible material vertically and/or horizontally against a base (5) where the flexible material to be cut is supported. The device can be used to apply constant and well-distributed pressure on the flexible material in the cutting zone, preventing the material from wrinkling and securing the
(Continued)

same in an optimal manner relative to the blade, thereby facilitating the cutting.

9 Claims, 3 Drawing Sheets

(51) Int. Cl.
*B26D 7/04* (2006.01)
*B26D 7/01* (2006.01)
*B26D 1/02* (2006.01)
*B26D 1/04* (2006.01)
*B26D 7/14* (2006.01)

(52) U.S. Cl.
CPC ................. *B26D 7/14* (2013.01); *D06H 7/00* (2013.01); *D06H 7/005* (2013.01); *A46B 2200/405* (2013.01)

(58) Field of Classification Search
USPC ......... 83/886, 880, 885, 162, 699, 426, 425, 83/438, 491, 544, 561, 465
See application file for complete search history.

(56) References Cited

U.S. PATENT DOCUMENTS

| | | | | | |
|---|---|---|---|---|---|
| 2,874,775 | A | 2/1959 | Muller | | |
| 2,913,926 | A * | 11/1959 | Hammond | B23D 45/06 | 29/DIG. 97 |
| 3,599,518 | A * | 8/1971 | Goettsch | B23D 35/008 | 83/13 |
| 3,618,436 | A * | 11/1971 | Brown | B26D 1/16 | 83/169 |
| 3,763,748 | A * | 10/1973 | Gallagher, Jr. | B23D 47/00 | 493/365 |
| 3,782,665 | A * | 1/1974 | Byrt | B65H 19/28 | 242/527.4 |
| 3,942,781 | A * | 3/1976 | Gerber | B23Q 1/032 | 269/289 R |
| 4,003,276 | A * | 1/1977 | Schmitt | B26D 7/1863 | 15/256.51 |
| 5,134,913 | A * | 8/1992 | Schroeder | B23Q 11/08 | 83/169 |
| 5,1349,13 | A * | 8/1992 | Schroeder | B26D 1/16 | 83/169 |
| 5,520,352 | A * | 5/1996 | Prix | B65H 19/26 | 242/527.3 |
| 5,836,224 | A * | 11/1998 | Gerber | B26D 7/018 | 83/169 |
| 2003/0079588 | A1* | 5/2003 | Hamilton | B23D 59/006 | 83/23 |
| 2007/0028741 | A1* | 2/2007 | Ruhland et al. | B26D 7/20 | 83/659 |
| 2008/0273951 | A1 | 11/2008 | Stein | | |
| 2012/0079932 | A1 | 4/2012 | Lin | | |

FOREIGN PATENT DOCUMENTS

| | | |
|---|---|---|
| GB | 2 000 439 A | 1/1979 |
| GB | 2 057 957 A | 4/1981 |

OTHER PUBLICATIONS

Extended European Search Report issued by the European Patent Office in connection with European Application No. EP 14867392.4; dated Jul. 28, 2017.

* cited by examiner

CUTTING DEVICE FOR FLEXIBLE MATERIAL

RELATED APPLICATIONS

This application is a § 371 national stage of PCT International Application No. PCT/ES2014/070899, filed Dec. 5, 2014, claiming priority of Spanish Patent Application P201331785, filed Dec. 5, 2013, the contents of each of which are hereby incorporated by reference into this application.

The present invention relates to a cutting device for flexible material, wherein a sheet of flexible material is cut by a blade.

BACKGROUND OF THE INVENTION

Currently there are known devices that cut flexible material with a blade, which either moves across a sheet of the flexible material to be cut, or moves said sheet of flexible material relative to a stationary blade.

A problem associated with this type of devices for cutting flexible material is that depending on the characteristics of the flexible material, for example if it is very thin or flexible, the flexible material cannot be correctly cut; instead, said blade tears, rips or wrinkles and jams the flexible material, but does not cut it. Said wrinkles are caused depending on the flexibility of the material to be cut and wear to the blade's sharpness.

Some systems incorporate rigid or flexible systems for holding down or guiding the material, at the top or bottom thereof. They cause wrinkles and often do not ensure a correct cut for all types of flexible materials, requiring different designs for different materials.

With a correct stabilization of the material to be cut and the blade, an optimal and faster cut is obtained, while making it possible to cut a wider range of flexible material with the same device, without adjustments, and for a longer period of time, the wearing and sharpening of the blade becoming less crucial.

Therefore, there is a clear need for a cutting device in which any type of flexible material can be correctly cut, even the thinnest flexible materials, by incorporating to the cutting device means that stabilize the flexible material with an adequate pressure such that the cut is correctly carried out.

DESCRIPTION OF THE INVENTION

With the cutting device for flexible material of the invention, the aforementioned problems are solved, in addition to having further advantages, which will be described below.

The cutting device for flexible material according to the present invention, comprises a blade, either said blade being movable with respect to a sheet of flexible material or said sheet of flexible material being movable with respect to said blade, and is characterized in that said blade is associated with a plurality of elastic bristles, which press the flexible material vertically and/or horizontally against a base where the flexible material being cut is supported, said bristles adapting themselves to the material and uniformly distributing the pressure across the surface area that it has to cut.

Advantageously, said plurality of elastic bristles are attached to a support on one of the ends thereof, thus defining a brush.

Said plurality of bristles may adopt different shapes according to the flexible material required to be cut.

According to a preferred embodiment, at least some of said plurality of bristles comprise a sphere at their tip in contact with the flexible material during the cutting operation.

Preferably, said bristles are made of synthetic or natural materials, although they could be made of any suitable elastic material that exerts sufficient pressure onto said base.

According to a preferred embodiment, said bristles have a diameter comprised between 0.05 mm and 2.5 mm, for example, 0.7 mm, and said bristles are variable in length, according to the shape, size and design of the blade, for example, between 3 mm and 500 mm, bearing a relation with the flexible material to be cut, the separation between said bristles being comprised between 0.001 and 5 mm.

In the cutting device for flexible material according to the present invention, said blade is straight or curved, and preferably said base, where the flexible material being cut is supported, is curved so as to correctly guide the flexible material.

Advantageously, said elastic bristles form an acute angle with the upper surface of said base, and said angle is advantageously adjustable in order to regulate the pressure against the base.

Preferably, said elastic bristles form an acute angle with one another, and said acute angle formed by the elastic bristles with one another is variable.

At least the following advantages are obtained with the cutting device according to the invention:

- It allows a constant and well-distributed pressure to be applied onto the flexible material across the cutting zone, preventing the material from wrinkling and securing the same in an optimal manner relative to the blade, thus facilitating the cut;
- It allows a reduced and distributed pressure to be applied, which is nonetheless, suitable for stabilizing the flexible material, given that if an excessive pressure were applied, the flexible material would become stalled, being stuck before reaching the blade, and if insufficient pressure were to be applied onto the flexible material, it would prevent an appropriate cut.
- It allows a distributed vertical pressure to be applied onto the surface to be cut, which prevents the flexible material from lifting while holding it against the blade;
- In addition, it also allows a horizontal pressure to be applied, which tends to stretch the flexible material;
- It allows the horizontal pressure to be changed by varying the opening angle and the bristles of the brush;
- It allows the individual pressure of each bristle to be very small, but collectively suitable and very well-distributed, such that they adapt themselves, without any type of specific adjustment, to different flexible materials;
- It allows the pressure to be applied in a zone that is very close to the blade, practically next to it;
- It allows its application in cutting devices that use straight blades, circular blades or with any other design, since the bristles are naturally distributed on both sides; and
- It ensures a clean cut.

BRIEF DESCRIPTION OF THE DRAWINGS

For a better understanding of all the foregoing, a set of drawings is attached therein, in which a practical embodiment is schematically represented only by way of non-limiting example.

DESCRIPTION OF A PREFERRED EMBODIMENT

The cutting device for flexible material, comprises a blade 1, which may be straight, curved, or with a design to be defined, placed on a base 5 for cutting a sheet of flexible material 4. In order to carry out this cut, either said blade 1 may move relative to said sheet of flexible material 4, or vice versa, i.e., a sheet of flexible material 4 may move relative to said blade 1.

As it has been mentioned earlier, in the conventional cutting devices for flexible material it is common that wrinkles are produced in the zone where the blade 1 is in contact with the sheet of flexible material 4, the cut not being correctly made, instead the sheet of flexible material 4 is torn or ripped, rather tan cut.

In order to solve this drawback, the cutting device according to the present invention, comprises a plurality of bristles 2 placed above said base 5, such that they vertically and horizontally press the sheet of flexible material 4 when the cut of the sheet of flexible material 4 is being carried out.

Figure 1:
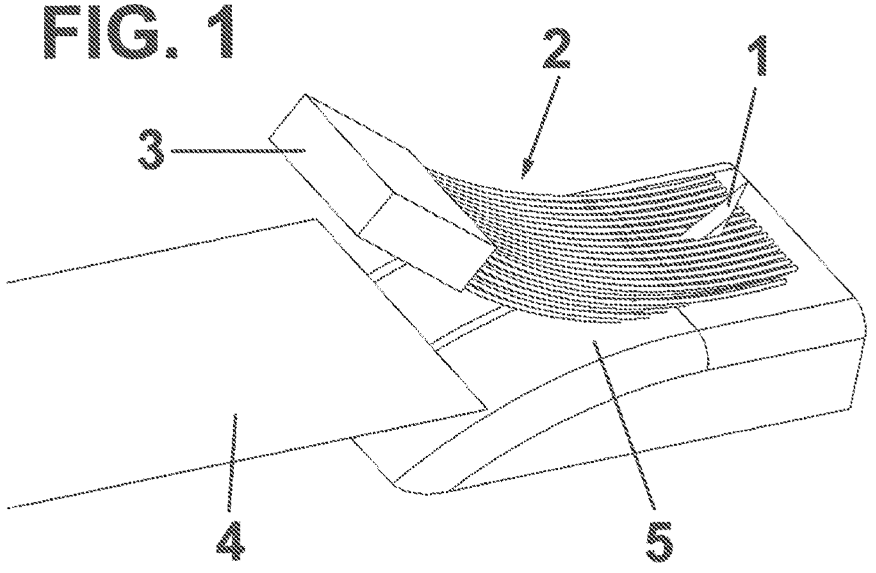
FIG. 1 is a perspective view of the cutting device for flexible material according to the present invention, before cutting the flexible material.
Figure 2:
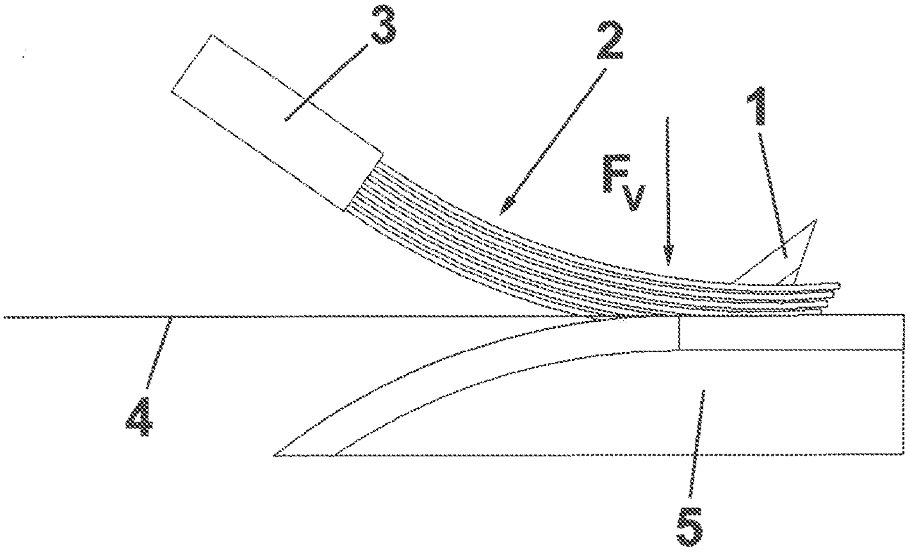
FIG. 2 is a side elevation view of the cutting device for flexible material according to the present invention, during the cut of the flexible material.
Figure 3:
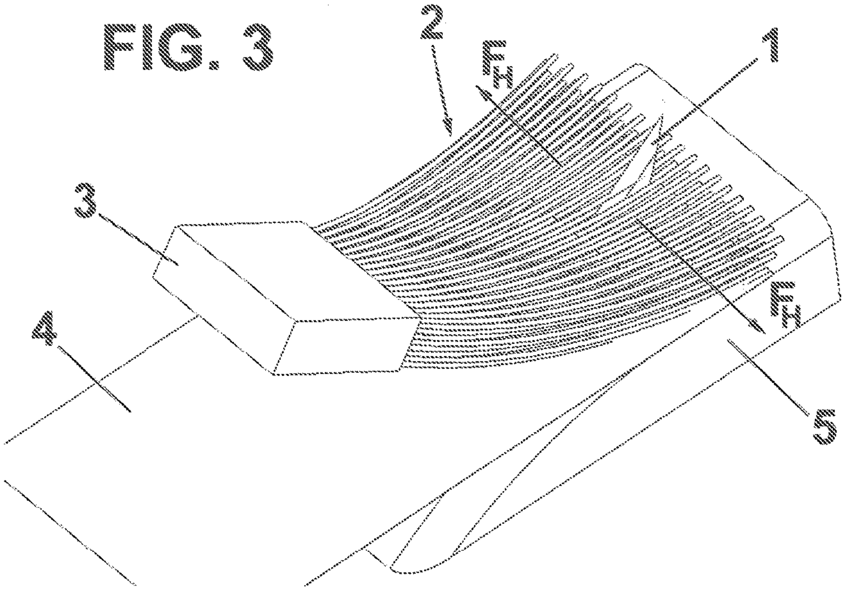
FIG. 3 is a perspective view of the cutting device for flexible material according to the present invention, during the cut of the flexible material.
Figure 4:
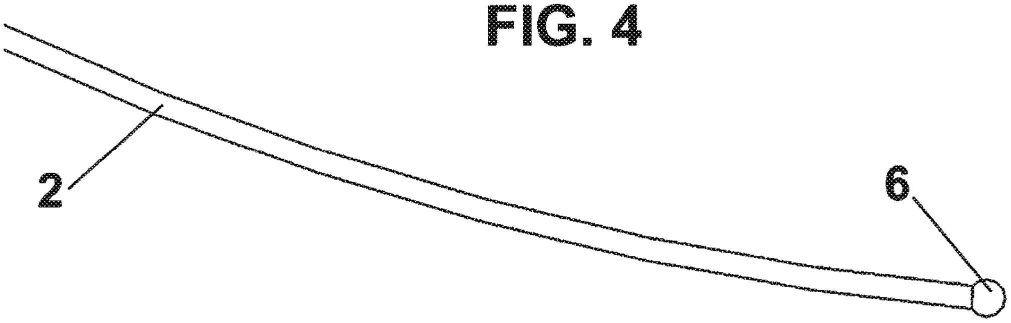
FIG. 4 is a side view of a bristle of the cutting device for flexible material according to the present invention, in accordance with an embodiment.
Figure 5:
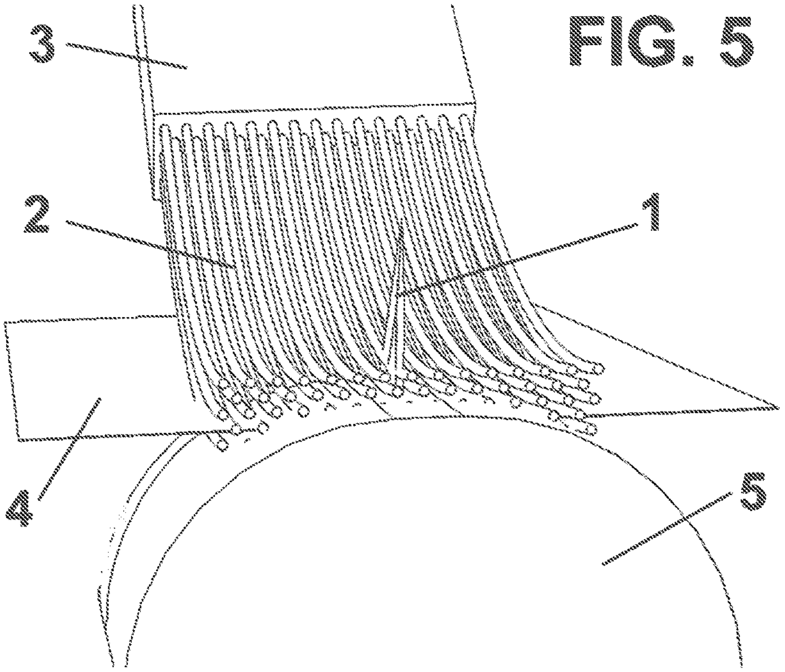
FIG. 5 is a perspective view of the cutting device for flexible material according to the present invention, during the cut of the flexible material, with a base that has a different design with regards to the preceding figures.

The pressure exerted by the bristles 2 onto the sheet of flexible material 4 has been represented in FIGS. 2 and 3 by means of corresponding arrows (indicated with $F_H$ in order to represent the horizontal or lateral force and Fv in order to represent the vertical force).

Said elastic bristles 2 form an acute angle with the upper surface of said base 5, and said angle is advantageously adjustable to regulate the pressure exerted onto the base 5.

Said bristles 2 are elastic, and according to a preferred embodiment, are made of a synthetic or natural material, with a diameter comprised between 0.05 mm and 2.5 mm, for example, 0.7 mm. Moreover, said bristles are variable in length, according to the shape, size and design of the blade, for example, between 3 mm and 500 mm, bearing a relation with the flexible material to be cut, the separation between said bristles being comprised between 0.001 and 5 mm.

In this way, the individual pressure applied by each bristle 2 onto the sheet of flexible material 4 is very low and distributed (in such a way that the material closer to the blade receives more pressure), however the set of bristles 2 allows a suitable pressure to be applied so as to hold the sheet of flexible material in order to avoid wrinkles and obtain a clean cut.

Said bristles 2 are attached to a support 3 on the end that is not in contact with the sheet of flexible material 4, such that the assembly of said bristles 2 and said support 3 define an element in the form of a brush.

As can be appreciated in the figures, the upper surface of said base 5 is preferably curved, although it could have any suitable form.

If desired, at the end of the bristles 2 that is in contact with the sheet of flexible material 4 during the cut, a sphere 6 may be placed, with a diameter slightly larger than the diameter of the bristles 2.

As an alternative, the end of the bristles 2 that is in contact with the sheet of flexible material 4 during the cut, may be straight.

Although reference has been made to a specific embodiment of the invention, it is obvious for a person skilled in the art that the cutting device for flexible material described may be the object of numerous variants and modifications, and that all the details mentioned may be suitably substituted with others, which are technically equivalent without departing from the scope of protection defined by the attached claims.

The invention claimed is:

1. A cutting device for flexible material comprising:

a blade (1), wherein either the blade (1) can move relative to a sheet of flexible material (4) or said sheet of flexible material (4) can move relative to said blade (1);

a base (5) having an upper surface where the flexible material to be cut is supported;

a plurality of elastic bristles (2) associated with the blade (1), the elastic bristles configured to contact the upper surface of the base (5), and configured to vertically and horizontally press the flexible material against the upper surface of the base (5), to stabilize and stretch the flexible material; and wherein the blade (1) is placed between the elastic bristles (2), and the elastic bristles (2) form an acute angle with the upper surface of the base (5) both (i) prior to the blade (1) moving relative to the sheet of flexible material (4) or said sheet of flexible material (4) moving relative to said blade (1), when the elastic bristles (2) contact the base (5), and (ii) during the cutting of the flexible material, when the elastic bristles (2) vertically and horizontally press the flexible material against the upper surface of the base (5), to stabilize and stretch the flexible material.

2. The cutting device for flexible material according to claim 1, wherein said plurality of elastic bristles (2) are attached to a support (3) on one of the ends thereof.

3. The cutting device for flexible material according to claim 1, wherein at least some bristles of said plurality of elastic bristles (2) comprise a sphere (6) at their tip in contact with the sheet of flexible material (4) during the cutting operation.

4. The cutting device for flexible material according to claim 1, wherein said elastic bristles (2) are made of synthetic materials, such as nylon.

5. The cutting device for flexible material according to claim 1, wherein said elastic bristles (2) have a diameter comprised between 0.05 mm and 2.5 mm.

6. The cutting device for flexible material according to claim 1, wherein said elastic bristles (2) have a length comprised between 3 mm and 500 mm.

7. The cutting device for flexible material according to claim 1, wherein the separation between said elastic bristles (2) is comprised between 0.001 mm and 5 mm.

8. The cutting device for flexible material according to claim 1, wherein said blade (1) is straight.

9. The cutting device for flexible material according to claim 1, wherein said upper surface of the base (5) against which the sheet of flexible material (4) to be cut rests is curved.

* * * * *